United States Patent [19]

Goodman

[11] Patent Number: 4,567,431
[45] Date of Patent: Jan. 28, 1986

[54] METHOD FOR REVEALING SEMICONDUCTOR SURFACE DAMAGE USING SURFACE DAMAGE USING SURFACE PHOTOVOLTAGE (SPV) MEASUREMENTS

[75] Inventor: Alvin M. Goodman, Princeton, N.J.
[73] Assignee: RCA Corporation, Princeton, N.J.
[21] Appl. No.: 547,326
[22] Filed: Oct. 31, 1983
[51] Int. Cl.⁴ .......................................... G01R 31/26
[52] U.S. Cl. ............................ 324/158 R; 324/158 D
[58] Field of Search ....................... 324/158 R, 158 D

[56] References Cited

U.S. PATENT DOCUMENTS

| | | | |
|---|---|---|---|
| 4,051,437 | 9/1977 | Lile et al. | 324/158 D X |
| 4,333,051 | 6/1982 | Goodman | 324/158 R |
| 4,393,348 | 7/1983 | Goldstein et al. | 324/158 R |
| 4,433,288 | 2/1984 | Moore | 324/158 R X |
| 4,454,472 | 6/1984 | Moore | 324/158 R |
| 4,494,069 | 1/1985 | Lin | 324/158 R |

OTHER PUBLICATIONS

A. M. Goodman, "Improvements in Method and Apparatus for Determining Minority Carrier Diffusion Length," International Electron Devices Meeting, Dec. 1980, pp. 231-234.
The American Society for Testing and Materials, "Minority Carrier Diffusion Length in Silicon by Measurement of Steady-State Surface Photovoltage," ANSI/ASTM standard F391-78, pp. 770-776.
A. M. Goodman, "Silicon-Wafer-Surface Damage Revealed by Surface Photovoltage Measurements," J. Appl. Phys. 53(11), Nov. 1982, pp. 7561-7565.
A. M. Goodman et al., "Silicon-Wafer Process Evaluation Using Minority-Carrier Diffusion-Length Measurement by the SPV Method," RCA Review, 44, 6 (1983), pp. 326-341.
C. Kittel, "Introduction to Solid State Physics," Wiley & Sons, 1956, pp. 536-561.

Primary Examiner—Stewart J. Levy
Assistant Examiner—Stephen M. Baker
Attorney, Agent, or Firm—Birgit E. Morris; Donald S. Cohen; Joseph D. Lazar

[57] ABSTRACT

The presence of crystallographic damage in a semiconductor surface region is determined by surface photovoltage (SPV) measurements. Deviations from the idealized straight line SPV plot of photon flux ($I_o$) versus reciprocal absorption coefficient ($\alpha^{-1}$) in upward-facing concave form are used as a criterion of surface quality. This criterion is used to determine the minimum etching required to remove the damaged surface.

10 Claims, 7 Drawing Figures

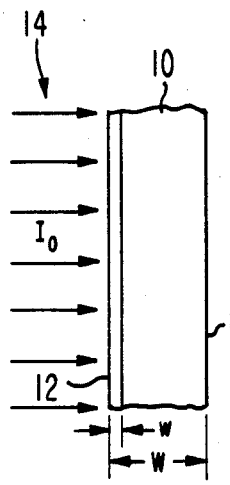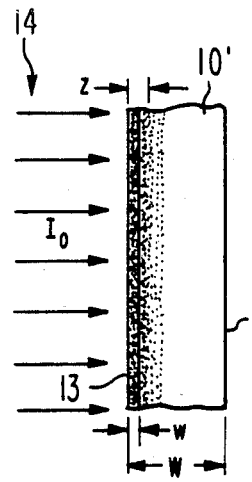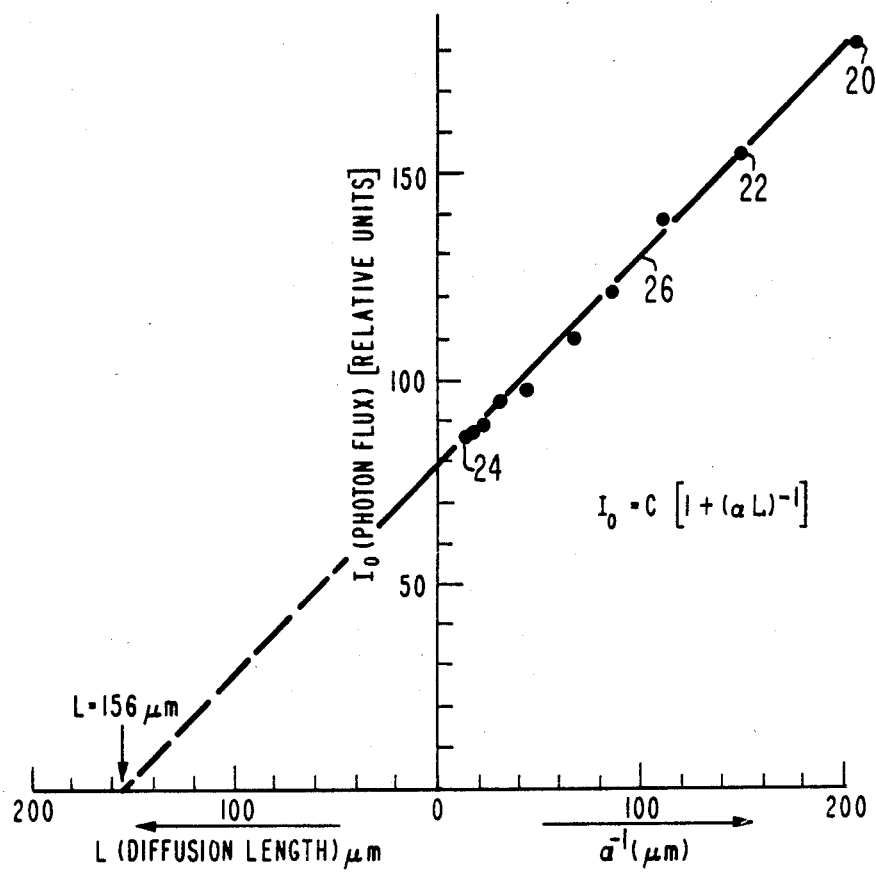

METHOD FOR REVEALING SEMICONDUCTOR SURFACE DAMAGE USING SURFACE DAMAGE USING SURFACE PHOTOVOLTAGE (SPV) MEASUREMENTS

This invention relates to a method for determining the minority carrier diffusion length in semiconductors using the constant-magnitude surface photovoltage (SPV) method. More particularly the invention relates to revealing surface damage using the SPV method.

BACKGROUND OF THE INVENTION

Apparatus and methods for determining the minority carrier diffusion length (L) using the SPV method are well known. In brief, the principle of the diffusion length (L) determination requires the illumination of a specimen surface with monochromatic radiation of energy slightly greater than the bandgap of the semiconductor. Electron-hole pairs are produced and diffuse to the illuminated (front) surface where they are separated by the electric field of the depletion region (i.e., the surface-space-charge region) to produce a surface photovoltage (SPV). A portion of the SPV signal is coupled to an amplifier for amplification and measurement. The photon flux (photons per sq. cm. per second) is adjusted to produce the same magnitude of SPV at various wavelengths of illumination. The photon flux required to produce this constant magnitude SPV signal is conveniently plotted on the ordinate against the reciprocal of the absorption coefficient on the abscissa for each wavelength. The resultant plot is typically linear and is extrapolated to the zero photon flux intercept on the negative abscissa. This intercept value is the effective diffusion length (L). For a more detailed description of the theory and background for this method, see an article "A Method for the Measurement of Short Minority Carrier Diffusion Lengths in Semiconductors", by A. M. Goodman in the *Journal of Applied Physics*, Vol. 32, No. 23, pp. 2550-2552, Dec. 1961, and the article by A. M. Goodman entitled "Improvements In Method and Apparatus For Determining Minority Carrier Diffusion Length", International Electron Devices Meeting, Dec. 1980, pp 231-234. The American Society for Testing and Materials has adopted a standard using this method which is published as ASTM F 391-78. The ASTM standard, when implemented according to the block diagram of FIG. 1 of ASTM F 291-78, is provided particularly for testing the diffusion length (L) for minority carriers in silicon but the method in general may be used for other semiconductor materials.

See U.S. Pat. No. 4,333,051, incorporated herein by reference thereto, entitled "Method and Apparatus For Determining Minority Carrier Diffusion Length In Semiconductors", issued on June 1, 1982 to A. M. Goodman for a description of an apparatus using this method in which a servo system maintains a constant predetermined value of the SPV thereby allowing the measurements to be carried out in a relatively short time. The SPV pickup electrode described in this patent minimizes the effects of drift caused by laterally diffusing minority carriers during a test.

In the practice of the procedure for determining diffusion length by SPV it has sometimes been found that the plot of the photon flux $I_o$) versus the reciprocal optical absorption coefficient ($\alpha^{-1}$) is not a straight line as expected from conventional theory. The deviation has been determined to be caused by surface damage. Surface damage as used herein shall mean the damage caused by defects in the bulk region adjacent to and including the surface of a body of semiconductor crystalline material. This region shall be simply termed hereinafter as the bulk surface region of the body. Such defects can include crystallographic misorientations such as edge dislocations, screw dislocations, and twinnings. See C. Kittel, Introduction to Solid State Physics, Wiley & Sons, 1956, pp. 536-561, for a discussion of dislocations in crystalline bodies. Such damage is typically caused by the sawing, slicing and lapping operations performed in semiconductor processing. However defined, surface damage as used herein is to be distinguished from defects on the surface of the semiconductor material in the form of scratches, recesses, particulates, and the like.

It has been found that etching away a sufficient amount of the damaged crystallographic surface portion of a wafer results in a straight plot of the SPV measurements. However there is nothing in the art teaching how to make a determination as to whether there is crystallographic damage in the bulk surface region of a semiconductor body.

SUMMARY OF THE INVENTION

According to the present invention surface photovoltage (SPV) measurements are used to reveal the presence of damage in the bulk surface region of a body of semiconductor crystalline material. A stable inversion layer at the body surface is established. Then the photon flux ($I_o$) as a function of the optical wavelength ($\lambda$) at a constant surface photovoltage is measured to provide a plurality of data points. The data points form a plot of photon flux versus the reciprocal optical absorption coefficient ($\alpha^{-1}$) Curvature of the plot from a straight line is an indicator of crystallographic damage in the material of the bulk surface region. According to a feature of the invention, damaged wafers of semiconductor material otherwise unuseable can be rendered useable by removing the damaged surface region to a depth determined by this method.

BRIEF DESCRIPTION OF THE DRAWING

FIG. 1 is a schematic of a sample wafer with the geometry to be used in the description;

FIG. 2 is a plot of relative photon flux ($I_o$) versus the reciprocal optical absorption coefficient ($\alpha^{-1}$);

FIG. 6 is a model of a wafer similar to FIG. 1 but with surface damage; and

DETAILED DESCRIPTION OF THE PREFERRED EMBODIMENTS

Figure 3:
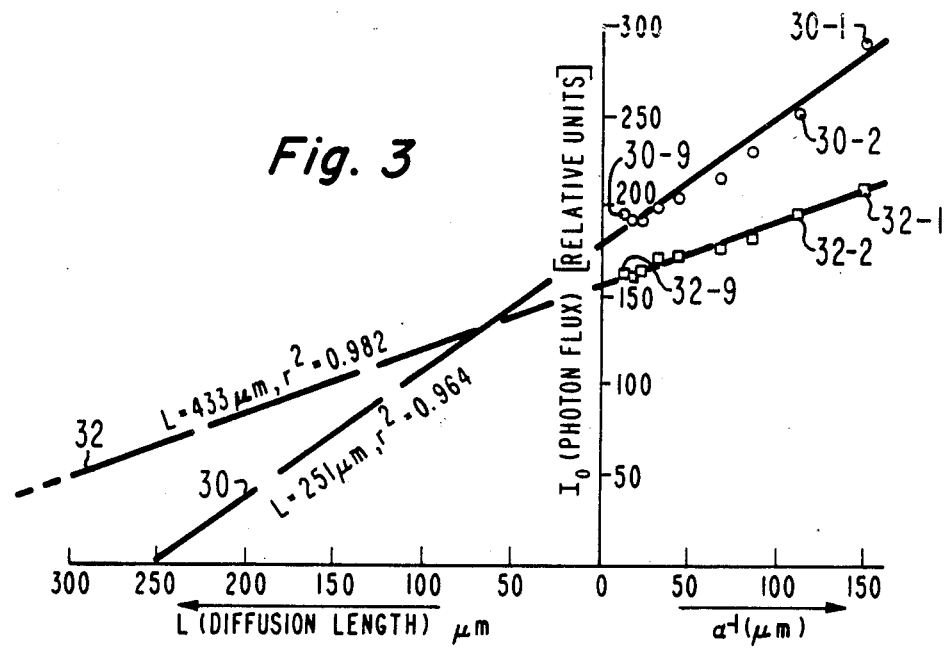
FIG. 3 depicts plots of relative photon flux versus reciprocal optical absorption coefficient for samples having damaged and damage-free surfaces.

The wafer 10 under test (sample) is assumed to be in the form of a homogeneous semiconductor slab of thickness W, as shown in FIG. 1. One surface 12 of the sample is uniformly illuminated by chopped monochromatic light 14 of photon energy (hν) slightly larger than the bandgap ($E_G$) of the semiconductor, while the opposite surface 16 is kept in the dark. Electron-hole pairs are produced by the absorbed photons; some of these pairs diffuse to the illuminated surface 12 where they are separated by the electric field of the surface space-charge region whose thickness is w, thereby producing a surface photovoltage $\Delta V$. A portion of $\Delta V$ is capacitively coupled to a transparent conducting electrode adjacent to the illuminated face; this signal is then amplified and rectified to provide a quasi-dc analog output that is proportional to $\Delta V$ as described in my above-identified U.S. Pat. No. 4,333,051. The value of $\Delta V$ is a function of the excess minority carrier density $\Delta p$ at the edge of the surface space-charge region. This density $\Delta p(0)$ is in turn dependent upon the incident light flux ($I_o$), the optical absorption coefficient ($\alpha$), the optical reflectance at the illuminated surface ($\rho$), the recombination velocity (s) at the illuminated surface, as well as the diffusion length (L). A steady-state solution of the one-dimensional diffusion equation for the sample geometry shown in FIG. 1 is $$\Delta p(0) = \frac{I_o(1-\rho)}{D/L + s} \cdot \frac{\alpha L}{1 + \alpha L} \quad (1)$$

This simplified expression is derived under the assumptions $\alpha W \gg 1$, $\alpha w \ll 1$, $W \gg L$, $w \ll L$, and $\Delta p \ll n_o$, where $n_o$ is the majority carrier density. See, for example, T. S. Moss, "Optical Properties of Semiconductors", (Butterworths, London, 1959), Chap. 4, for a description of the mathematical derivation of equation (1) above.

A series of different wavelength (λ) values is selected to give different values of $\alpha$. At each wavelength, $I_o$ is adjusted to give the same value (i.e., a constant magnitude) of $\Delta V$. It follows then, that $\Delta p(0)$ is a constant. If $\rho$ is essentially constant over the wavelength region of interest, equation (1) may be written as $$I_o = C[1 + (\alpha L)^{-1}], \quad (2)$$

where C is a constant. If $I_o$ is plotted against $\alpha^{-1}$ for each constant-magnitude $\Delta V$ point, the result is a linear graph represented by line 26 whose extrapolated intercept on the negative $\alpha^{-1}$ axis is L. This is illustrated in FIG. 2.

It is seen that the data points 20, 22,...24 in FIG. 2 when plotted, do indeed, lie on the straight line 26, and this type of measurement result is normally observed. Line 26 extended to the intercept indicates a diffusion length L of 156 μm. Occasionally, some slight curvature is observed. However, the central problem with which the present invention is concerned is derived from a group of 24 new wafers from which most of the measured plots of $I_o$ vs $\alpha^{-1}$ exhibited "obvious curvature." The terms "slight" curvature and "obvious" curvature are, of course, qualitative, and this requires further explanation. Some curvature quantification may be obtained by the following procedure: (1) fit the data with a "best" straight-line plot which minimizes the sum of the squares of the differences between photon flux $I_o$ data points and the "best" straight line, and (2) determine the correlation coefficient r for that fit. Under certain conditions, coefficient r will be a measure of the curvature of the $I_o$ vs $\alpha^{-1}$ data plot.

For a perfect fit, coefficient r will have the value 1; this will be true if and only if every data point lies directly on the "best" straight line. Values of coefficient r less than 1 may occur for either (or both) of two reasons: (i) random fluctuations in the data, and (ii) non-linearity in the functional relationship between the flux $I_o$ and $\alpha^{-1}$. The first reason (i) will be present to some degree in any practical measurement system, preferably at some small relatively constant level. The second reason (ii) may be present if one or more of the assumptions employed in the derivation of equation (1) are invalid. The second reason may also be present if a non-random error is built into the measurement system. This possibility was effectively eliminated by showing that the presence of the non-linearity was sample dependent and that it was not present with properly prepared samples. A crude measure of non-linearity mentioned for reason (ii) may be obtained by considering the extent to which the actual coefficient r falls below the minimum value of r expected as a result of the fluctuations for reason (i).

Most calculator and computer programs for linear curve fitting (linear regression and analaysis) give $r^2$ (rather than r) as an output. For convenience, then, $r^2$ will be used as the parameter of correlation in the remainder of this specification.

It has been found experimentally that $r^2$ values between 0.98 and 1.00 are generally obtained from $I_o$ vs $\alpha^{-1}$ plots, and 0.98 has been set as a minimum value of $r^2$ for which the data are considered reliable. This cutoff value is somewhat arbitrary. Some data plots with $r^2 = 0.98$ appear to have only random scatter of the data points about the "best" straight line; others show small but clearly perceptible curvature. Most data plots with $r^2 < 0.98$, however, show obvious curvature. It should be noted that the cutoff value for $r^2$ is (and should be) system dependent. Thus, a noisy system would, for example, require a lower cutoff value of $r^2$ because of the larger random fluctuations in the $I_o$ vs $\alpha^{-1}$ data.

Experiments performed in the practice of the invention utilized silicon wafers sliced from 5 cm diameter, 35 ±10 Ω-cm, n-type float-zoned silicon. See my copending U.S. patent application filed on even date herewith (Ser. No. 547,012now U.S. Pat. No. 4,507,334, issued Mar. 26,1985) for a description of preparing the surface of a wafer with a stable inversion layer prior to SPV tests.

In the embodiment now being described using a body formed of n-type material, the stable inversion layer is preferably achieved by certain dichromates or permangates. In particular, the oxidizing agents used to practice the invention for n-type bodies are taken from the group consisting of potassium dichromate, ammonium dichromate and potassium permanganate. In the embodiment to be described, potassium dichromate is used, while potassium permanganate is preferred.

When p-type material forms the body, simply removing any oxides existing on the body surface will provide the required stable inversion layer in preparation of the SPV measurements. Thus a hydrogen fluoride-containing etch can be used for such purposes.

In the present embodiment the n-type wafer slices were 890 to 915 μm in thickness and were "deep etched" to remove approximately 50 μm from each surface. Conventional wisdom derived from previous processing assumed that this deep etching should have removed all of the slicing damage. Several wafers were set aside at this point for a conventional surface damage test, a so-called Wright etch test, that will be described later.

The wafers that were to be used for the SPV measurements were then cleaned in a 10% (vol) solution of $H_2O_2$ in $H_2SO_4$ for 10 minutes at 135° C.

The following process steps were carried out on each wafer:

1. Etching at room temperature for 3 minutes in a mixture of HF (hydrofluoric) and $HNO_3$ (nitric) acids (20 parts by volume of 70% $HNO_3$ and 1 part by volume of 49% HF). The etch was quenched with distilled water to avoid leaving a stain film.

2. The surface was immersed in a 1% (by weight) aqueous solution of potassium dichromate ($K_2Cr_2O_7$) at 85° C. for 3 minutes. Each wafer was allowed to air dry before rinsing off the visible residue with distilled water. Finally, each wafer was allowed to dry in clean air.

3. Measurements were made of the photon flux ($I_o$) vs the absorption coefficient ($\alpha^{-1}$) at constant SPV according to my above-identified U.S. Pat. No. 4,333,051.

The results of the measurements showed wide variation in both the L and $r^2$ values. The $r^2$ values for the 24 wafers ranged from 0.858 to 0.984. A typical example of a plot of $I_o$ versus $\alpha^{-1}$ is shown in FIG. 3 by data points 30-1, 30-2, ... 30-9. It is seen that the data points 30-1, etc. define a curved path. Nevertheless a straight line 30 can be fitted through those points as a best fit. The extension of line 30 to the intercept indicates a diffusion length L of 251 μm. This is a length that is based on the assumption that all the data points 30-1, etc. were in the straight line of line 30. This plot represents a typical wafer that had a damaged surface region. Data points of measurements of $I_o$ vs ($\alpha^{-1}$) for a typical wafer that has been etched to remove the damaged surface region are shown in FIG. 3 by points 32-1, 32-2, ... 32-9. It is seen that these points are essentially along the line 32 with very little curvature. The line 32 is, thus, typical of a wafer that is not damaged. Moreover, it represents a wafer that was previously unuseable due to damage in its bulk surface region and is now in a useable damage-free form after etching. This wafer thus has a diffusion length of 433μm and has a squared coefficient ($r^2$) of 0.982 the significance of which will be explained in greater detail.

Figure 4:
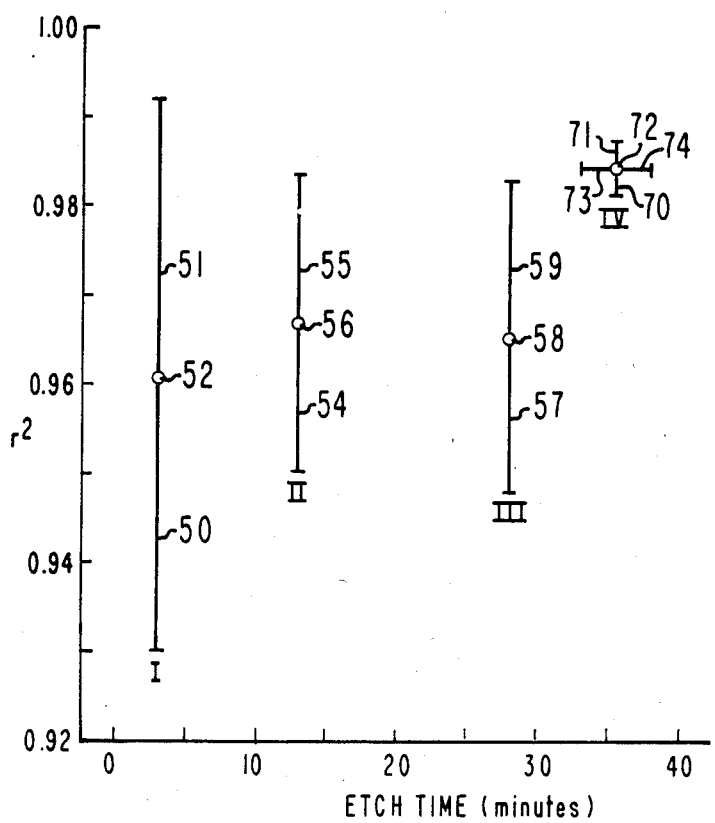
FIG. 4 is a mean and standard deviation of a correlation coefficient squared ($r^2$) for a group of test wafers as a function of etching time.
Figure 5:
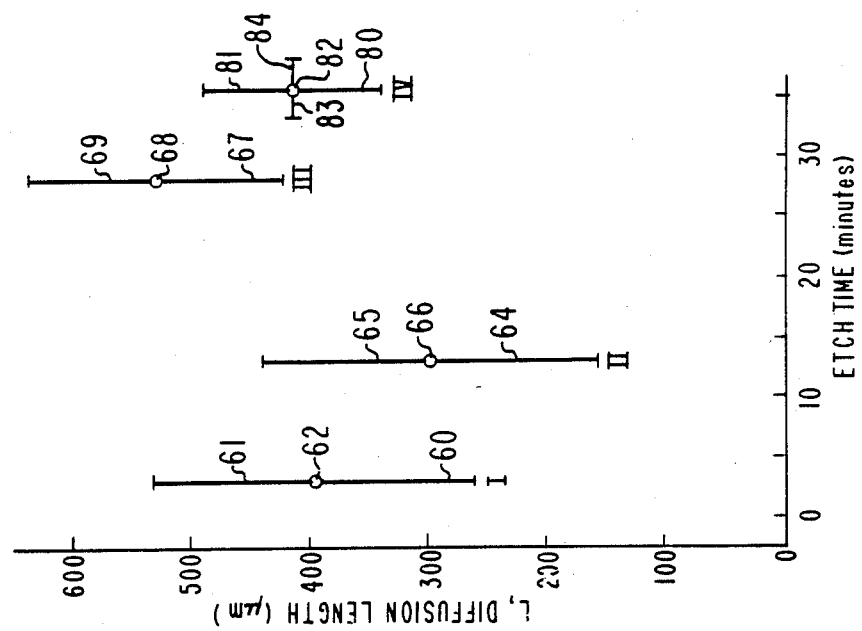
FIG. 5 is a mean and standard deviation of the minority carrier diffusion length (L) for the test wafers as a function of etching time.

The twenty-four wafers, as explained above, were etched and tested to provide the experimental data now to be described. The average value designated as 52 on the plot of $r^2$ for the 24 wafers is shown in FIG. 4 above the data marked (I); the standard deviation $\sigma(r^2)$ of the data is indicated by the flag 50 and 51 about the average value 52. (See H. D. Brunk, "An Introduction to Mathematical Statistics", Ginn and Co., N.Y. 1960, Chapt. 12 for a discussion of standard deviation analysis.) The average value designated 62 of L and the standard deviation $\sigma(L)$ are shown in FIG. 5 as the flags 60 and 61 about the data marked (I).

In every case, the curvature of $I_o$ vs $\alpha^{-1}$, if significant enough to be observed, was in a concave-up direction as shown in FIG. 3 by points 30-1 to 30-9.

Steps 1, 2, and 3 were repeated on each of the 24 wafers; however, this time the etching was for 10 minutes, and at that point, the total (cumulative) time in slow etch was 13 minutes. The results of the measurements are shown in FIGS. 4 and 5 as the data marked (II) along flag lines 54 and 55 and 64 and 65 with averages 56 and 66, respectively.

Steps 1, 2, and 3 were repeated again on each wafer; this time the etching was for 15 minutes and at that point the total time in slow etch was 28 minutes. The results of the measurements are shown in FIGS. 4 and 5 as the data marked (III) along flag lines 57 and 59 and 67 and 69 with averages 58 and 68, respectively.

Again, steps 1, 2, and 3 were repeated on each wafer; this time the etching was for 5 minutes. At that point the total time in slow etch was 33 minutes and data plots for 16 of the 24 wafers had $r^2$ values above 0.98. The other 8 wafers were etched once more for another 5 minutes and subjected to steps 2 and 3. At that point all of the data plots had $r^2$ values in excess of 0.98. The slow etching time at that point was 33 minutes for 16 wafers and 38 minutes for 8 wafers. The results of the measurements on all 24 wafers taken as a group are shown as data marked IV in FIGS. 4 and 5.

The average $r^2$ value (FIG. 4) was 72 with deviations indicated by flag lines 70 and 71. The horizontal line 73 and 74 represent the etch time of 33 and 38 minutes for the 16 and 8 wafers respectively. The average diffusion length L is at 82 (FIG. 5) with deviations shown by lines 80 and 81.

All of the data are summarized in the following Table I. Column I to IV correspond to the data shown in FIGS. 4 and 5. Column IV(a) and IV(b) show the data for the 16 and 8 wafers etched at the indicated times. The averaged data calculated for the respective parameters are shown within the symbols < >.

TABLE

| | SUMMARY OF EXPERIMENTAL RESULTS | | | | | |
|---|---|---|---|---|---|---|
| | I | II | III | IV(a) | IV(b) | IV |
| Time etched (minutes) | 3 | 13 | 28 | 33 | 38 | 33[16] 33[8] |
| Number of Samples | 24 | 24 | 24 | 16 | 8 | 24 |
| $<r^2>$ | .9609 | .9668 | .9655 | .9847 | .9841 | .9845 |
| $\sigma(r^2) = <(r^2 - <r^2>)^2>^{\frac{1}{2}}$ | .3090 | .0166 | .0173 | .0029 | .0026 | .0029 |
| $<L>$ (μm) | 397 | 298 | 531 | 443 | 361 | 416 |
| $\sigma(L) = <(L - <L>)^2>^{\frac{1}{2}}$(μm) | 135 | 142 | 107 | 60 | 69 | 74 |

In separate tests, it was established that 38 minutes of etching time under the conditions used in step 1 removed about 20 μm from each side of the wafer being etched.

The several wafers that were set aside as mentioned above, after the initial heavy etching, were subjected to a conventional test for surface damage. See M. Wright Jenkins, "A New Preferential Etch for Defects in Silicon Crystals", J. Electrochem. Soc. 124, 577 (1977), for a description of this test. A portion of each wafer was masked and then etched for 10 minutes in the HF/$HNO_3$ mixture, thereby creating a step in the surface approximately 5 μm high. The etch was quenched in distilled water and the mask was removed. The wafers were then cleaned and subjected to etching to reveal dislocation etch pits according to the above-cited procedure by Wright. There were clearly more etch pits on the upper step (the portion that had been masked during the acid etch) than on the lower step. This confirms that etching in acid etch removes surface damage and reveals a less damaged underlayer.

It is clear from the experimental observation described above and summarized in the table that the initial deep etching of 50 μm from each surface did not remove all of the saw damage from the wafers, and that the remaining damage layer (thickness ~20 μm) caused a non-linearity in the plots of $I_o$ versus $\alpha^{-1}$. The depth of the damage as well as the effect of the damage on the $I_o$ versus $\alpha^{-1}$ plot differed from wafer to wafer; this is shown by the large scatter in the initial value of $r^2$ as shown by line 50, 54 and 57 (FIG. 4) and the different etching times 3, 12 and 28 minutes, respectively required to eliminate—or at least significantly decrease—the scatter.

However, it is not clear a priori why the surface damage region, of ~20 μm in thickness, should cause a concave-up curvature of the $I_o$ versus $\alpha^{-1}$ plot of points 30-1 . . . 30-9 as seen (FIG. 3). If, for example, the only effect of the surface damage region were a decreased value of a diffusion length L' less than the bulk value diffusion length L, one might expect a large slope of $I_o$ versus $\alpha^{-1}$ for $\alpha^{-1}$ values less than L', with a decreasing slope as $\alpha^{-1}$ becomes larger than L'. That is, a damaged region with L'<L should lead to a curve of $I_o$ vs $\alpha^{-1}$ that is concave down; this speculation is contrary to all of the experimental observations.

Another, perhaps simpler, way to see the difficulty in understanding how the surface damage region can produce the observed form of the plot of $I_o$ versus $\alpha^{-1}$ is to note that there is a minimum in the plot at $\alpha^{-1}{}_{minimum}$. This means that in region $\alpha^{-1} < \alpha^{-1}{}_{minimum}$.

The value of $I_o$ required to produce a constant $\Delta p(0)$ (equation (1)) decreases as the distance that the optically generated carriers must travel increases.

Note that an enhanced surface recombination velocity s cannot explain the anomaly because according to the theory of the measurement, the form of the result $[I_o(\alpha^{-1})]$ should be independent of recombination velocity s as discussed in my article in the 1961 Journal of Applied Physics, identified above.

It is difficult to understand the experimental results if the only effect of the surface damage were to produce a region with a diminished diffusion length (L). However, it is possible to understand the results if the effect of the surface damage is to produce a region of diminished quantum efficiency η for hole-electron-pair generation, and a model which exhibits such behavior, as will now be explained.

Reference is made to FIG. 6 of a model of a sample wafer 10' similar to wafer 10 of FIG. 1 in having a thickness W but having a damaged surface region characterized by parameter z beneath surface 13.

Assume that the sample 10' is to be tested by the SPV method in which the damaged region is adjacent to the illuminated surface 13 (FIG. 6), and that the damage decreases exponentially with increasing distance into the bulk. The depth of the damaged region, characterized by the parameter z, is less than L, but may be less than, equal to, or greater than the space charge region w. In this region η, the quantum efficiency for hole-electron-pair generation is:

$$\eta = 1 - e^{-x/z}. \qquad (3)$$

A solution of the steady-state diffusion equation for this model, which is represented schematically in FIG. 6, gives the result:

$$\Delta p(0) = \frac{I_o(1-\rho)}{(D/L)+S} \cdot \frac{\alpha L}{1+\alpha L} \cdot \frac{L/z}{\alpha L + 1 + (L/z)} \qquad (4)$$

under the same assumptions as those for the solution shown in Equation (1). Note that when the parameter z is zero, equation (4) is identical to equation (1). Following the SPV procedure as explained above, one can obtain from equation (4) an expression describing the photon flux ($I_o$) as a function of reciprocal optical absorption coefficient ($\alpha^{-1}$) constant SPV magnitude V:

$$I_o = C[\alpha z + 1 + (z/L)][1 + (\alpha L)^{-1}]. \qquad (5)$$

Equation (5) has a minimum at $$\alpha_{min} = \frac{1}{L}\left(\frac{L+z}{z}\right)^{\frac{1}{2}}. \qquad (6)$$

Figure 7:
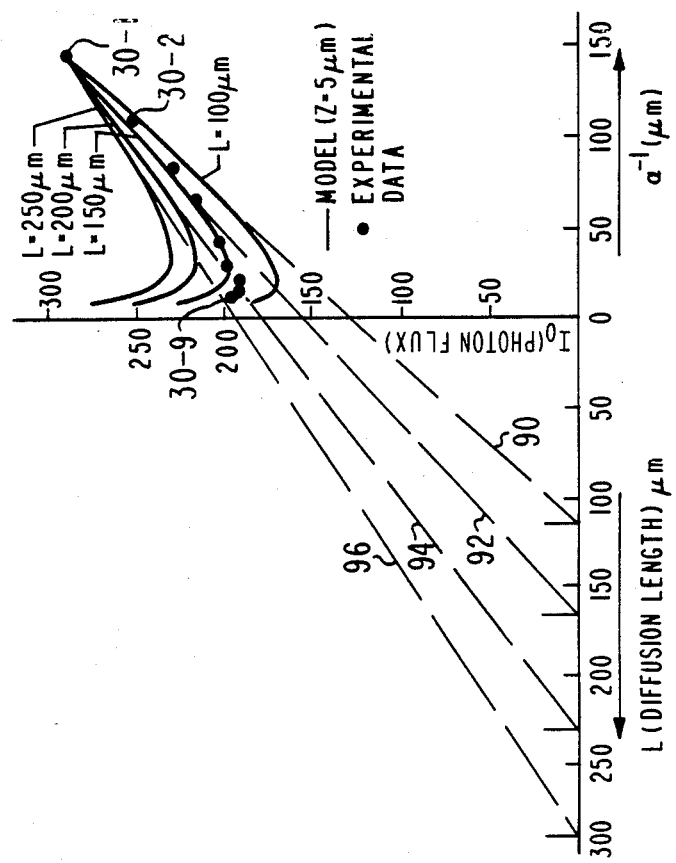
FIG. 7 is a plot of the photon flux versus absorption coefficient for the surface-damaged model shown in FIG. 6 and experimentally determined data.

Using equation (5), the photon flux ($I_o$ is plotted against $\alpha^{-1}$ as shown in FIG. 7 for z=5 μm and solid curved lines L=100, 150, 200, and 250 μm. Also plotted in FIG. 7 are the experimental data points 30-1 . . . 30-9 from FIG. 3.

There is good qualitative agreement between the form of the model $I_o$ versus $\alpha^{-1}$ curved plots for L=100 . . . 250 μm and the form of the experimentally determined $I_o$ versus $\alpha^{-1}$ plot of points 30-1 . . . 30-9. No attempt has been made to adjust the parameters z and L for an optimum line fit because the model is probably much too simple to quantitatively account for the experimentally observed $I_o(\alpha^{-1})$ plots 30-1, etc. First, although the form of η(x) (equation (3)) is physically reasonable, it is, in fact, assumed for lack of more detailed information. Second, the diffusion length (L) is also likely to vary as a function of depth in the silicon (Si) region adjacent to the surface 13. In addition, in order to obtain a good quantitative fit, other effects such as variation of α(λ) or doping density as a function of depth in the silicon (Si) might have to be taken into account.

It is interesting to note that if the surface-damage-model $I_o(\alpha^{-1})$ plots are used to estimate the value of L by drawing dashed lines 90, 92, 94 and 96 tangent to plots L100, L150, L200 and L250 respectively, and extrapolating the lines to the negative $\alpha^{-1}$ axis, the intercept value will be larger than L in every case. Thus line 90 intercepts at L≅110 μm, 92 at L≅160 μm, 94 at L≅230 μm and 96 at L≅300 μm. This will be true even if the tangent is drawn at the steepest part of the $I_o(\alpha^{-1})$ plot. Thus, the model suggests that if an experimental $I_o(\alpha^{-1})$ plot has concave-upward curvature, an estimate of L based on this plot is likely to be larger than the true value of L in the region immediately below the surface; i.e., in the surface damage region. However, a comparison of plots 30 and 32 of FIG. 3 suggests that the same estimated value of L may be significantly smaller than the true value of L in the bulk Si under the surface damage region.

Thus in the practice of the invention a concave-upward curvature of an experiment $I_o(\alpha^{-1})$ plot should serve as a warning that (i) any estimate of diffusion length based on it is likely to be in error, and (ii) there exists, under the illuminated surface, a damaged region which must be removed before a true bulk value of L can be obtained.

It should now be appreciated that anomalous results of SPV measurements on silicon (Si) wafers are associated with a damaged region of the crystalline material beneath the illuminated surface of the wafer being measured. The anomaly is a concave-upward curvature of the $I_o(\alpha^{-1})$ plot with an $r^2$ value derived from linear regression analysis, less than the normally observed minimum value (~0.98). Removal of the damaged region by an appropriate etching procedure allows subsequent SPV measurements whose results are substantially free of the previously observed anomaly.

While the embodiment describing the invention used n-type silicon material, it will be understood that the invention can be practiced on bodies formed of germanium or gallium arsenide.

What is claimed is:

1. A method for revealing the presence of damage in the bulk surface region of a body of semiconductor crystalline material comprising the steps of:
   (a) preparing a layer of the surface region to develop a stable inversion layer at the body surface;
   (b) measuring the photon flux ($I_o$) as a function of the optical wavelength ($\lambda$) at a constant surface photovoltage to provide a plurality of data points forming a plot of photon flux ($I_o$) versus reciprocal optical absorption coefficient ($\alpha^{-1}$); and
   (c) determining the existence of curvature from said plot of said data points as an indicator of crystallographic damage in the material of said bulk surface region.

2. A method according to claim 1 further comprising the step of comparing said plot of data points to a straight line best fitting said data points to determine a correlation coefficient (r) or the square ($r^2$) of said correlations coefficient for said fitted straight line, whereby the value of said coefficient is a measure of said curvature.

3. The method of claim 2 further comprising the step of determining the standard deviation ($\sigma$) from an average value of said coefficient determined from a plurality of said plots according to step (b) of claim 1 for a plurality of bulk surface regions on the same body or different bodies and comparing said coefficient to a coefficient derived from similar data from specimen bodies having known damage or absence of damage.

4. The method of claim 1 wherein said body is a wafer of silicon.

5. The method of claim 1 wherein said body is a wafer of germanium.

6. The method of claim 1 wherein said body is a wafer of gallium arsenide.

7. The method of claim 2 wherein said coefficient has a value less than 1.

8. The method of claim 1 wherein said body is formed of n-type silicon material and said preparation step comprises:
   applying an oxidizing agent taken from the group consisting of potassium dichromate, ammonium dichromate, and potassium permanganate.

9. The method of claim 1 wherein said body is formed of p-type silicon material and said preparation step comprises removing by etching any oxides existing on said surface.

10. The method of claim 1 further comprising the steps of:
   (a) removing a layer of material from said body approximating the estimated depth of damaged material;
   (b) repeating steps (a), (b), and (c) of claim 1 to determine the presence of damage; and
   (c) repeating step (a) above as necessary until the damaged surface region is removed.

* * * * *

UNITED STATES PATENT AND TRADEMARK OFFICE
CERTIFICATE OF CORRECTION

PATENT NO. : 4,567,431

DATED : January 28, 1986

INVENTOR(S) : Alvin M. Goodman

It is certified that error appears in the above-identified patent and that said Letters Patent is hereby corrected as shown below:

The title should be --"Method For Revealing Semiconductor Surface Damage Using Surface Photovoltage (SPV) Measurements"--

Column 1, line 66, "$I_o$)" should be --($I_o$)--.

Column 2, line 36, a "." should be after ($\alpha^{-1}$).

Column 3, line 42, "$I_o = C[1 + (\alpha L)^-]$" should be --$I_o = C[1 + (\alpha L)^{-1}]$--.

Column 4, line 43, a "," should be after the Serial Number.

Column 8, line 14, "V" should be --$\Delta V$--.

Column 9, line 9, there should be a "," after value.

Signed and Sealed this

Eighth Day of April 1986

[SEAL]

Attest:

DONALD J. QUIGG

Attesting Officer

Commissioner of Patents and Trademarks